(12) United States Patent
Liu et al.

(10) Patent No.: US 10,614,560 B2
(45) Date of Patent: Apr. 7, 2020

(54) APPARATUS AND METHOD FOR IMAGE PROCESSING

(71) Applicant: Fujitsu Limited, Kawasaki-shi, Kanagawa (JP)

(72) Inventors: Wei Liu, Beijing (CN); Wei Fan, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 163 days.

(21) Appl. No.: 15/838,591

(22) Filed: Dec. 12, 2017

(65) Prior Publication Data

US 2018/0260943 A1    Sep. 13, 2018

(30) Foreign Application Priority Data

Mar. 7, 2017    (CN) .......................... 2017 1 0131001

(51) Int. Cl.
| | | |
|---|---|---|
| *G06T 5/50* | (2006.01) | |
| *G06T 7/11* | (2017.01) | |
| *G06T 3/40* | (2006.01) | |
| *G06T 1/00* | (2006.01) | |

(Continued)

(52) U.S. Cl.
CPC .............. *G06T 5/50* (2013.01); *G06T 1/0007* (2013.01); *G06T 3/4007* (2013.01); *G06T 3/4038* (2013.01); *G06T 5/002* (2013.01); *G06T 7/11* (2017.01); *G06T 7/33* (2017.01);

(Continued)

(58) Field of Classification Search
CPC ..... G06T 5/50; G06T 7/11; G06T 7/33; G06T 1/0007; G06T 3/4007; G06T 3/4038; G06T 5/002; G06T 2200/32; G06T 2207/20221; G06T 2210/21
See application file for complete search history.

(56) References Cited

U.S. PATENT DOCUMENTS 5,387,983 A * 2/1995 Sugiura .............. H04N 1/40075
358/434
5,583,659 A * 12/1996 Lee .......................... G06K 9/38
358/3.13

(Continued)

FOREIGN PATENT DOCUMENTS

CN        102542555 B1 * 12/2010

OTHER PUBLICATIONS

Google Scholar Search Results.*

*Primary Examiner* — Qun Shen
(74) *Attorney, Agent, or Firm* — Staas & Halsey LLP

(57) ABSTRACT

An image processing apparatus and an image processing method where the apparatus includes: a seam line acquisitor configured to acquire a seam line of a first image in images to be stitched; a segmenter configured to segment, in an extension direction of the seam line of the first image, a center region including the seam line in the first image into blocks, where an intersection point of a block boundary with the seam line of the first image is located in a strong gradient region; a matcher configured to perform keypoint matching based on the intersection point to find a coordinate point corresponding to the intersection point in a position region corresponding to the seam line in a second image in the images to be stitched; and a fuser configured to fuse the first image with the second image based on the intersection point and the coordinate point.

17 Claims, 4 Drawing Sheets

(51) Int. Cl.
  *G06T 5/00*   (2006.01)
  *G06T 7/33*   (2017.01)
(52) U.S. Cl.
  CPC .............................. *G06T 2200/32* (2013.01);
      *G06T 2207/20221* (2013.01); *G06T 2210/21*
      (2013.01)

(56) References Cited

U.S. PATENT DOCUMENTS

| | | | |
|---|---|---|---|
| 2004/0057633 A1* | 3/2004 | Mai ..................... | G06T 3/4038 |
| | | | 382/284 |
| 2004/0062454 A1* | 4/2004 | Komiya ................ | G06T 5/50 |
| | | | 382/284 |
| 2007/0154095 A1* | 7/2007 | Cao ..................... | G06K 9/00234 |
| | | | 382/190 |
| 2012/0019614 A1* | 1/2012 | Murray ................ | H04N 13/106 |
| | | | 348/36 |
| 2013/0223758 A1* | 8/2013 | Hou ..................... | G06T 3/4038 |
| | | | 382/274 |
| 2015/0070523 A1* | 3/2015 | Chao ................... | H04N 5/23216 |
| | | | 348/218.1 |
| 2016/0088282 A1* | 3/2016 | Sadi .................... | H04N 13/194 |
| | | | 348/38 |
| 2016/0275662 A1* | 9/2016 | Hasegawa ............. | G06T 3/0068 |
| 2016/0373647 A1* | 12/2016 | Garcia Morate .. | H04N 5/23222 |

\* cited by examiner

APPARATUS AND METHOD FOR IMAGE PROCESSING

CROSS-REFERENCE TO RELATED APPLICATIONS

This application claims the benefit and priority of Chinese Application No. 201710131001.3, filed on Mar. 7, 2017, entitled "Apparatus and Method for Image Processing", the entire disclosure of which is incorporated herein by reference.

BACKGROUND

1. Field

The present disclosure relates to the technical field of image processing, and in particular to an image processing apparatus and an image processing method for seamlessly stitching images.

2. Description of the Related Art

This part provides background information related to the present disclosure, which is not necessarily the conventional technology.

Document image stitching techniques are applied in various fields such as stitching of a large amount of old newspapers, multi-focus image fusion and library document digitization. However, the effect of image stitching is often unstable, it is difficult to obtain a highly accurate result, and the stitched image is sometimes unsatisfactory.

SUMMARY

Additional aspects and/or advantages will be set forth in part in the description which follows and, in part, will be apparent from the description, or may be learned by practice thereof.

This part provides a general summary of the present disclosure, rather than a complete disclosure of a full scope or all features of the present disclosure.

An object of the present disclosure is to provide an image processing apparatus and an image processing method, with which two images can be stitched at any position of an overlapping region of the two images, where stable performance can be achieved, and a stitching result which is highly accurate and seamless can be obtained.

According to an aspect of the present disclosure, an image processing apparatus is provided, which includes: a seam line acquisitor configured to acquire a seam line of a first image in images to be stitched; a segmenter configured to segment, in an extension direction of the seam line of the first image, a center region including the seam line in the first image into blocks, where an intersection point of a block boundary with the seam line of the first image is located in a strong gradient region; a matcher configured to perform keypoint matching based on the intersection point to find a coordinate point corresponding to the intersection point in a position region corresponding to the seam line in a second image in the images to be stitched; and a fuser configured to fuse the first image with the second image based on the intersection point and the coordinate point.

According to another aspect of the present disclosure, an image processing method is provided, which includes: acquiring a seam line of a first image in images to be stitched; segmenting, in an extension direction of the seam line of the first image, a center region including the seam line in the first image into blocks, where an intersection point of a block boundary with the seam line of the first image is located in a strong gradient region; performing keypoint matching based on the intersection point to find a coordinate point corresponding to the intersection point in a position region corresponding to the seam line in a second image in the images to be stitched; and fusing the first image with the second image based on the intersection point and the coordinate point.

According to another aspect of the present disclosure, there is provided a machine-readable storage medium in which a program product including machine-readable instruction codes stored therein is carried, where the instruction codes, when being read and executed by a computer, enable the computer to perform the image processing method according to the present disclosure.

With the image processing apparatus and the image processing method according to the present disclosure, two images can be stitched at any position in a common region of two images, and a seamless stitching result can be obtained.

From the description herein, further applicability regions are apparent. The description and specific examples in the summary are for illustrative purposes only and are not intended to limit the scope of the present disclosure.

BRIEF DESCRIPTION OF THE DRAWINGS

The drawings described herein are used for illustrating the selected embodiments, rather than all of the possible embodiments, and are not intended to limit the scope of the present disclosure. In the drawings.

Figure 1:
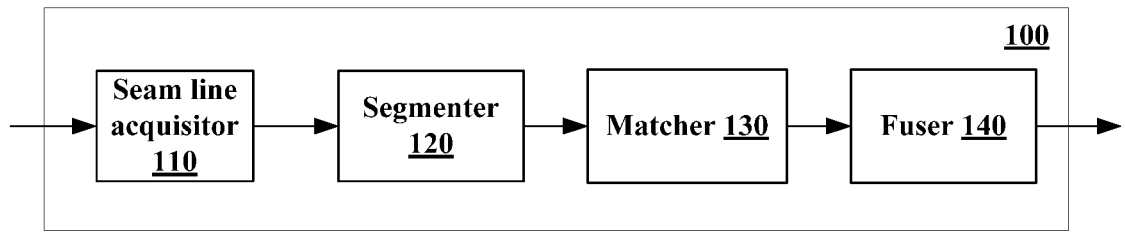
FIG. 1 is a block diagram illustrating a structure of an image processing apparatus according to an embodiment of the present disclosure.

Although the present disclosure is susceptible to various modifications and substitutions, specific embodiments thereof are shown in the drawings as an example and are described in detail herein. However, it should be understood that the description for specific embodiments herein is not intended to limit the present disclosure into a disclosed particular form, but rather, the present disclosure aims to cover all modifications, equivalents and substitutions within the spirit and scope of the present disclosure. It should be noted that, throughout the drawings, a numeral indicates a component corresponding to the numeral.

DETAILED DESCRIPTION

Reference will now be made in detail to the embodiments, examples of which are illustrated in the accompanying drawings, wherein like reference numerals refer to the like elements throughout. The embodiments are described below by referring to the figures.

Examples of the present disclosure are described now more fully with reference to the drawings. The following description is merely exemplary substantively and is not intended to limit the present disclosure and an application or use thereof.

Exemplary embodiments are provided below to make the present disclosure thorough and convey a scope of the present disclosure to those skilled in the art. Examples of various specific details, such as specific elements, devices, and methods, are set forth to provide thorough understanding for the embodiments of the present disclosure. It is apparent to those skilled in the art that the exemplary embodiments may be embodied in multiple different forms without using specific details, and should not be construed as limiting the scope of the present disclosure. In some exemplary embodiments, well-known processes, well-known structures, and well-known technology are not described in detail.

FIG. 1 illustrates a structure of an image processing apparatus 100 according to an embodiment of the present disclosure. As shown in FIG. 1, the image processing apparatus 100 according to the embodiment of the present disclosure may include a seam line acquisitor 110, a segmenter 120, a matcher 130 and a fuser 140.

The seam line acquisitor 110 may acquire a seam line of a first image in images to be stitched. It should be understood by those skilled in the art that a seam line of an image refers to a line formed when the image is stitched.

The segmenter 120 may segment, in an extension direction of the seam line of the first image, a center region including the seam line in the first image into blocks. An intersection point of a block boundary with the seam line of the first image is located in a strong gradient region.

In the present disclosure, the center region in the image is set as a region including the seam line in the image. For example, in a case that two images are stitched side by side, the seam line of the image may be extended from up to down. In this case, the segmenter 120 may segment the center region in the first image into blocks in a vertical direction, and the block boundary is horizontally extended. The horizontally extended block boundary intersects with the seam line extended from up to down to form an intersection point. On the other hand, in a case that the two images are stitched one above another, the seam line of the image may be horizontally extended. In this case, the segmenter 120 may segment the center region in the first image into blocks in a horizontal direction, and the block boundary is vertically extended. The vertically extended block boundary intersects with the horizontally extended seam line to form an intersection point.

The segmenter 120 is configured to allow the intersection point of the block boundary with the seam line of the first image to be located in the strong gradient region. It should be understood by those skilled in the art that a strong gradient region refers to a region in which gradient changes drastically. The gradient of a region in the image changing drastically generally indicates that the region is located at an edge of the foreground object in the image. When the intersection point is located in the strong gradient region by the segmenter 120, a case where the block boundary passes through the foreground object in the image can be avoided as much as possible.

Next, the matcher 130 may perform keypoint matching based on the intersection point of the block boundary with the seam line of the first image to find a coordinate point corresponding to the intersection point in a position region corresponding to the seam line of the first image in a second image in the images to be stitched. A coordinate point may be found in the second image by keypoint matching performed by the matcher 130. The coordinate point is located in the position region corresponding to the seam line of the first image in the second image, and corresponds to the intersection point of the block boundary with the seam line of the first image.

Next, the fuser 140 may fuse the first image with the second image based on the intersection point and the coordinate point to obtain a fused (i.e., stitched) image. According to a preferred embodiment of the present disclosure, the fuser 140 may fuse the first image with the second image with an interpolation method. The interpolation method is well known to those skilled in the art and is not described in detail herein.

In the image processing apparatus 100 according to the embodiment of the present disclosure, the center region including the seam line in the image to be stitched is segmented into blocks, and the intersection point of the block boundary with the seam line is located in the strong gradient region. Therefore, a case where the block boundary passing through a foreground object in the image can be avoided as much as possible. In addition, as compared with a solution in which the intersection point is randomly selected, by obtaining the stitched image with the image processing apparatus 100 according to the embodiment of the present disclosure, a stable performance can be achieved, and a stitching result which is highly accurate and seamless can be obtained.

The image processing apparatus according to the present disclosure is described in further detail below to better understand the technical solution of the present disclosure.

Figure 2:
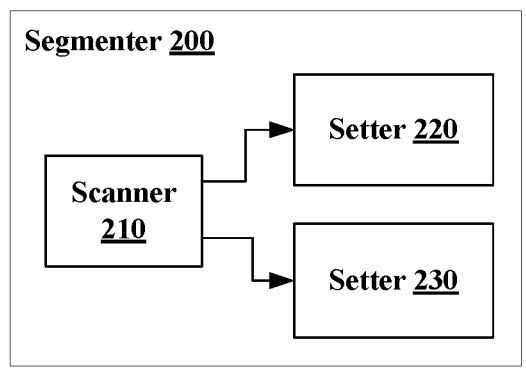
FIG. 2 is a block diagram illustrating a structure of a segmenter included in an image processing apparatus according to an embodiment of the present disclosure.

FIG. 2 illustrates a segmenter 200 in an image processing apparatus according to an embodiment of the present disclosure. The segmenter 200 shown in FIG. 2 corresponds to the segmenter 120 shown in FIG. 1.

As shown in FIG. 2, the segmenter 200 may include a scanner 210, a setter 220 (a first setter) and a setter 230 (a second setter).

First, the scanner 210 may scan the seam line of the first image in the extension direction of the seam line.

During the scanning process, in a case that a black pixel of the seam line of the first image is scanned and successive black pixels of which the number is greater than a preset threshold immediately after the black pixel are scanned, the setter 220 may set the black pixel as an intersection point of a block with the seam line of the first image.

On the other hand, in a case that a white pixel of the seam line of the first image immediately after a black pixel is scanned and successive black pixels of which the number is greater than a preset threshold immediately before the black pixel are scanned, the setter 230 may set the black pixel as an intersection point of a block with the seam line of the first image.

It should be understood by those skilled in the art that, a region where the black pixel is located is a strong gradient region, and a region where the white pixel is located is a weak gradient region. According to the segmenter 200 shown in FIG. 2, in a case that a black pixel immediately after a white pixel of the seam line of the first image is scanned, or a black pixel immediately before a white pixel is scanned, the setter 220 or 230 sets the black pixel as an intersection point of a block with the seam line. In other words, the block boundary corresponds to the edge of the strong gradient region, thereby avoiding a case where the block boundary passes through the foreground object in the image. In addition, it is further prescribed for the setters 220 and 230 that, the number of successive black pixels should be greater than a preset threshold, thereby eliminating the interference caused by noise.

Figure 3:
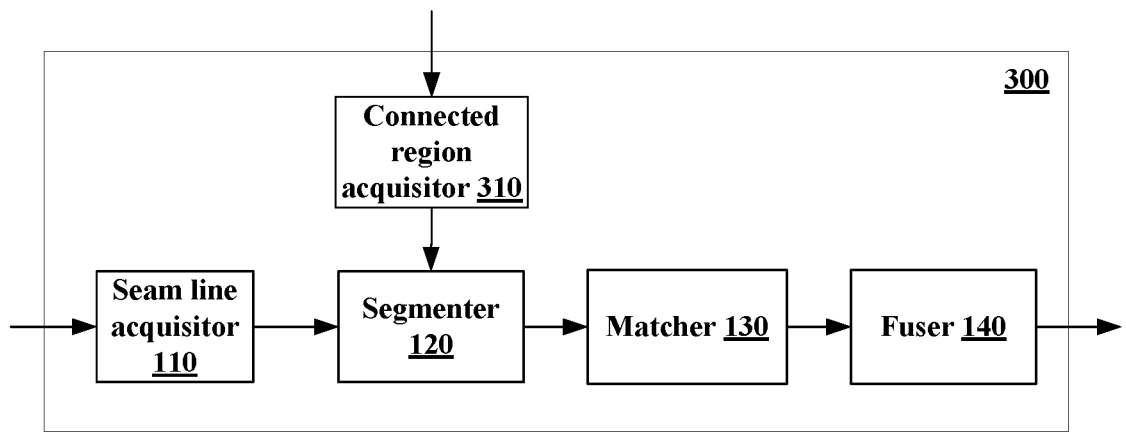
FIG. 3 is a block diagram illustrating a structure of an image processing apparatus according to another embodiment of the present disclosure.

FIG. 3 illustrates an image processing apparatus 300 according to another embodiment of the present disclosure. Except for a connected region acquisitor 310, a structure of the image processing apparatus 300 shown in FIG. 3 is the same as that of the image processing apparatus 100 shown in FIG. 1. The same components as the image processing apparatus 100 of the image processing apparatus 300 are not described herein.

According to the image processing apparatus 300 shown in FIG. 3, the connected region acquisitor 310 may acquire a connected region having an area greater than a preset value in the center region including the seam line in the first image. It should be noted that the connected region herein refers to a strong gradient region. The connected region acquired by the connected region acquisitor 310 has an area greater than a preset value, thereby eliminating the interference caused by the noise.

Based on the connected region acquired by the connected region acquisitor 310, the segmenter 120 may segment the center region into blocks, thereby avoiding a case where the block boundary passes through the connected region acquired by the connected region acquisitor 310, in order to further avoid the case where the block boundary passes through the foreground object in the image.

Figure 4:
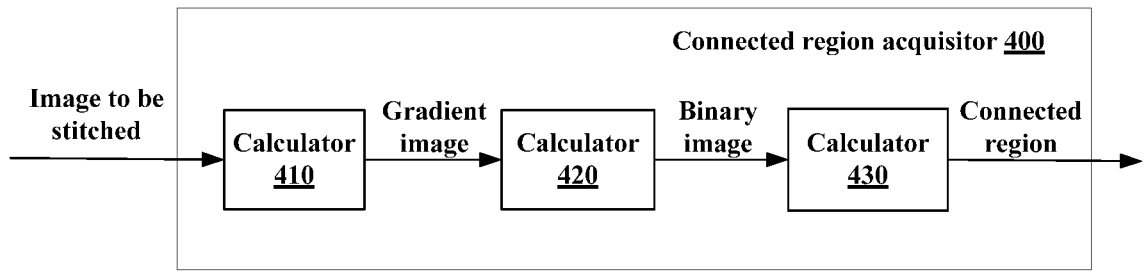
FIG. 4 is a block diagram illustrating a structure of a connected region acquisitor included in an image processing apparatus according to an embodiment of the present disclosure.

FIG. 4 illustrates a connected region acquisitor 400 in an image processing apparatus according to an embodiment of the present disclosure. The connected region acquisitor 400 shown in FIG. 4 corresponds to the connected region acquisitor 310 shown in FIG. 3.

As shown in FIG. 4, the connected region acquisitor 400 may include a calculator 410 (a first calculator), a calculator 420 (a second calculator) and a calculator 430 (a third calculator).

The calculator 410 may calculate a gradient image of the first image by processing the first image in the images to be stitched. It should be noted that a method for calculating the gradient image is not limited in the present disclosure, and any known method may be adopted by those skilled in the art to calculate the gradient image of the image.

Next, the calculator 420 may calculate a binary image of the first image based on the gradient image calculated by the calculator 410. Similarly, a method for calculating the binary image is not limited in the present disclosure, and any known method may be adopted by those skilled in the art to calculate the binary image of the image.

Next, the calculator 430 may calculate the connected region based on the binary image calculated by the calculator 420. Similarly, a method for calculating the connected region is not limited in the present disclosure, and any known method may be adopted by those skilled in the art to calculate the connected region of the image.

The connected region acquisitor 400 shown in FIG. 4 can acquire the connected region in the first image in images to be stitched for the segmenter to segment the center region into blocks. Based on the connected region acquired by the connected region acquisitor 400, the segmenter can segment the center region into blocks, such that a case where the block boundary passes through the connected region acquired by the connected region acquisitor 400 can be avoided, thereby further avoiding the case where the block boundary passes through the foreground object in the image.

Figure 5:
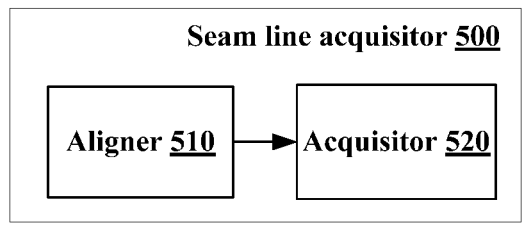
FIG. 5 is a block diagram illustrating a structure of a seam line acquisitor included in an image processing apparatus according to the embodiment of the present disclosure.

FIG. 5 illustrates a seam line acquisitor 500 in an image processing apparatus according to an embodiment of the present disclosure. The seam line acquisitor 500 shown in FIG. 5 corresponds to the seam line acquisitor 110 shown in FIG. 1 and FIG. 3.

As shown in FIG. 5, the seam line acquisitor 500 may include an aligner 510 and an acquisitor 520.

The aligner 510 may roughly align the first image with the second image to obtain an overlapping region of the first image with the second image. According to a preferred embodiment of the present disclosure, the aligner 510 may roughly align the first image with the second image with a template matching method or a keypoint matching method. The template matching method and the keypoint matching method are well known to those skilled in the art and are not described in detail herein.

Next, the acquisitor 520 may acquire the seam line of the first image in the images to be stitched in the overlapping region obtained by the aligner 510, where the seam line passes through a minimum number of foreground pixels. According to a preferred embodiment of the present disclosure, the acquisitor 520 may acquire the seam line in the overlapping region with a dynamic path planning method. The dynamic path planning method is well known to those skilled in the art and is not described in detail herein.

The seam line acquisitor 500 shown in FIG. 5 can acquire the seam line of the first image in the images to be stitched.

Figure 6:
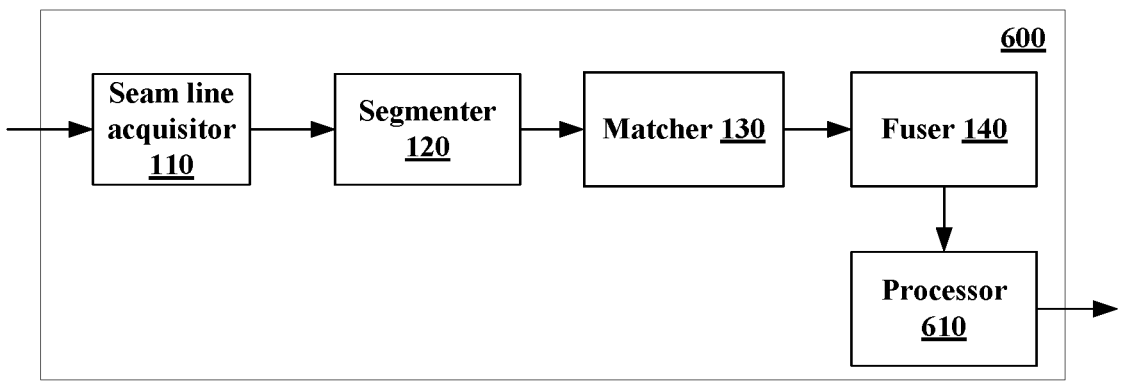
FIG. 6 is a block diagram illustrating a structure of an image processing apparatus according to another embodiment of the present disclosure.

FIG. 6 illustrates an image processing apparatus 600 according to another embodiment of the present disclosure. Except for a processor 610, a structure of the image processing apparatus 600 shown in FIG. 6 is the same as that of the image processing apparatus 100 shown in FIG. 1. The same components as the image processing apparatus 100 of the image processing apparatus 600 are not described herein.

According to the image processing apparatus 600 shown in FIG. 6, the processor 610 may blur the fused image, so that the processed image looks more natural. A method for blurring the image is not limited in the present disclosure, and any known method may be adopted by those skilled in the art to blur the image.

An image processing method according to an embodiment of the present disclosure is described below with reference to FIG. 7. Images can be seamlessly stitched with the method according to the embodiment of the present disclosure.

Figure 7:
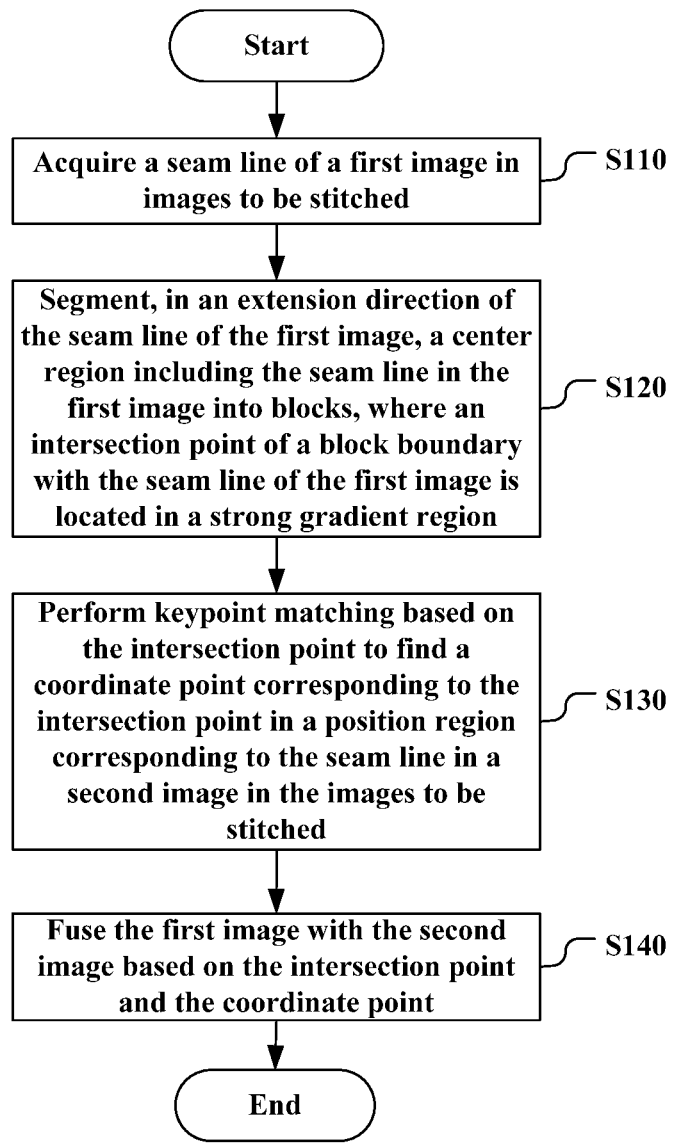
FIG. 7 is a flowchart illustrating an image processing method according to an embodiment of the present disclosure.

As shown in FIG. 7, the image processing method according to the embodiment of the present disclosure starts from step S110. In step S110, a seam line of a first image in images to be stitched is acquired.

Next, in step S120, a center region including the seam line in the first image is segmented into blocks in an extension direction of the seam line of the first image, where an intersection point of a block boundary with the seam line of the first image is located in a strong gradient region.

Next, in step S130, keypoint matching is performed based on the intersection point to find a coordinate point corresponding to the intersection point in a position region corresponding to the seam line in a second image in the images to be stitched.

Next, in step S140, the first image is fused with the second image based on the intersection point and the coordinate point. After step S140, the process ends.

According to a preferred embodiment of the present disclosure, the segmenting the center region including the seam line in the first image into blocks may include: scanning the seam line of the first image in the extension direction; setting, in a case that a back pixel of the seam line of the first image is scanned and successive black pixels of which the number is greater than a preset threshold immediately after the black pixel are scanned, the black pixel as an intersection point of a block with the seam line of the first image; and setting, in a case that a white pixel of the seam line of the first image immediately after a black pixel is scanned and successive black pixels of which the number is greater than a preset threshold immediately before the black pixel are scanned, the black pixel as an intersection point of a block with the seam line of the first image.

According to a preferred embodiment of the present disclosure, the method may further include: acquiring a connected region having an area greater than a preset value in the center region, and segmenting the center region into blocks, where the block boundary does not pass through the connected region.

According to a preferred embodiment of the present disclosure, the acquiring the connected region having an area greater than the preset value in the center region may include: calculating a gradient image of the first image; calculating a binary image of the first image based on the gradient image; and calculating the connected region based on the binary image.

According to a preferred embodiment of the present disclosure, the acquiring the seam line of the first image in the images to be stitched may include: roughly aligning the first image with the second image, to obtain an overlapping region of the first image and the second image; and acquiring the seam line in the overlapping region, where the seam line passes through the least number of foreground pixels.

According to a preferred embodiment of the present disclosure, the first image may be roughly aligned with the second image with a template matching method or a keypoint matching method.

According to a preferred embodiment of the present disclosure, the seam line may be acquired in the overlapping region with a dynamic path planning method.

According to a preferred embodiment of the present disclosure, the first image may be fused with the second image with an interpolation method.

According to a preferred embodiment of the present disclosure, the method may further include blurring a fused image.

Various embodiments of the above steps of the image processing method according to the embodiment of the present disclosure are described above in detail, and are not repeated herein.

It is apparent that various operation procedures of the image processing method according to the present disclosure may be implemented by computer-executable programs stored in various machine-readable storage mediums.

In addition, the object of the present disclosure can also be achieved in the following manner. A storage medium in which the above executable program codes are stored is directly or indirectly provided to a system or device. A computer, or a central processing unit (CPU) in the system or the device read and execute the above program codes. As long as the system or the device has a function of executing a program, the embodiment of the present disclosure is not limited to the program, and the program may be in any form such as a target program, a program executed by an interpreter or a script program provided to the operating system.

The above machine-readable storage mediums include but are not limited to, various memory and storage units, semiconductor devices, disk units such as an optical disk, a magnetic disk and a magneto-optical disk, and other medium suitable for storing information.

In addition, the computer may also implement the technical solution of the present disclosure by connecting to a website on the Internet, downloading and installing the computer program codes according to the present disclosure to a computer and executing the program codes.

Figure 8:
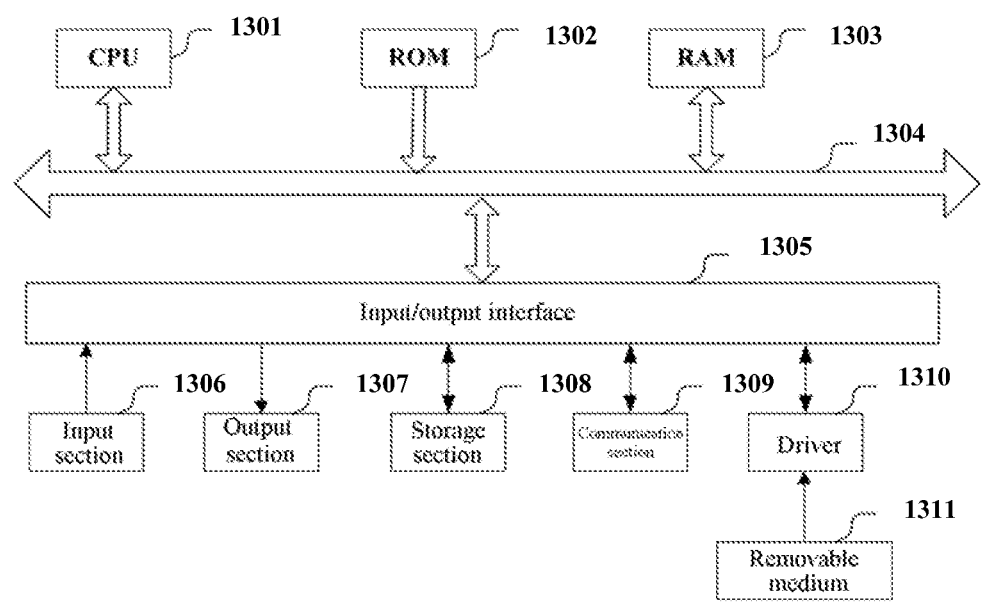
FIG. 8 is a block diagram illustrating an exemplary structure of a general purpose personal computer in which an image processing apparatus and an image processing method according to an embodiment of the present disclosure may be implemented.

FIG. 8 is a block diagram illustrating an exemplary structure of a general purpose personal computer in which an image processing apparatus and an image processing method according to an embodiment of the present disclosure may be implemented.

As shown in FIG. 8, a CPU 1301 executes various processes based on a program stored in a read-only memory (ROM) 1302 or a program loaded to a random access memory (RAM) 1303 from a storage section 1308. The data needed for the various processing of the CPU 1301 may be stored in the RAM 1303 as needed. The CPU 1301, the ROM 1302 and the RAM 1303 are liked with each other via a bus 1304. An input/output interface 1305 is also linked to the bus 1304.

The following components are linked to the input/output interface 1305: an input section 1306 (including keyboard, mouse and the like), an output section 1307 (including displays such as a cathode ray tube (CRT), a liquid crystal display (LCD), a loudspeaker and the like), a storage section 1308 (including hard disk and the like), and a communication section 1309 (including a network interface card such as a LAN card, modem and the like). The communication section 1309 performs communication processing via a network such as the Internet. A driver 1310 may also be linked to the input/output interface 1305 as needed. The removable medium 1311, for example, a magnetic disc, an optical disc, a magneto-optical disc, a semiconductor memory and the like, may be installed in the driver 1310 as needed, so that the computer program read there from is installed in the storage section 1308 as appropriate.

In a case that the foregoing series of processing is implemented by software, programs forming the software are installed from a network such as the Internet or a non-transitory computer/machine readable storage medium such as the removable medium 1311.

It should be appreciated by those skilled in the art that the storage medium is not limited to the removable medium 1311 shown in FIG. 8, which has programs stored therein and is distributed separately from the device to provide programs to users. The removable medium 1311 may be, for example, a magnetic disc (including floppy disc (registered trademark)), an compact disc (including compact disc read-only memory (CD-ROM) and digital versatile disc (DVD)), a magneto-optical disc (including mini disc (MD) (registered trademark)), and a semiconductor memory. Alternatively, the storage medium may be the hard discs included in the ROM 1302 and the storage section 1308 in which programs are stored, and can be distributed to users along with the device in which they are incorporated.

In the system and method according to the present disclosure, it is apparent that the respective components or steps can be decomposed and/or recombined. These decompositions and/or recombinations shall be regarded as equivalent solutions of the present disclosure. Moreover, the above series of processing steps can naturally be performed temporally in the sequence as described above but will not be limited thereto, and some of the steps can be performed in parallel or independently from each other.

While the embodiments of the present disclosure have been described in detail with reference to the drawings, it shall be understood that the embodiments as described above are merely illustrative but not limitative of the present disclosure. Those skilled in the art can make various modifications and variations to the above embodiments without departing from the spirit and scope of the present disclosure. Accordingly, the scope of the present disclosure is defined merely by the appended claims and their equivalents.

With respect to embodiments including the above embodiments, the following notes are also disclosed:

Note 1. An image processing apparatus, including:
a seam line acquisitor configured to acquire a seam line of a first image in images to be stitched;
a segmenter configured to segment, in an extension direction of the seam line of the first image, a center region including the seam line in the first image into blocks, where an intersection point of a block boundary with the seam line of the first image is located in a strong gradient region;
a matcher configured to perform keypoint matching based on the intersection point to find a coordinate point corresponding to the intersection point in a position region corresponding to the seam line in a second image in the images to be stitched; and
a fuser configured to fuse the first image with the second image based on the intersection point and the coordinate point.

Note 2. The image processing apparatus according to Note 1, where the segmenter includes:
a scanner configured to scan the seam line of the first image in the extension direction;
a first setter configured to set, in a case that a black pixel of the seam line of the first image is scanned and successive black pixels of which the number is greater than a preset threshold immediately after the black pixel are scanned, the black pixel as an intersection point of a block with the seam line of the first image; and
a second setter configured to set, in a case that a white pixel of the seam line of the first image immediately after a black pixel is scanned and successive black pixels of which the number is greater than a preset threshold immediately before the black pixel are scanned, the black pixel as an intersection point of a block with the seam line of the first image.

Note 3. The image processing apparatus according to Note 1, further including:
a connected region acquisitor configured to acquire a connected region having an area greater than a preset value in the center region, where the segmenter is configured to segment the center region into blocks, where the block boundary does not pass through the connected region.

Note 4. The image processing apparatus according to Note 3, where the connected region acquisitor includes:
a first calculator configured to calculate a gradient image of the first image;
a second calculator configured to calculate a binary image of the first image based on the gradient image; and
a third calculator configured to calculate the connected region based on the binary image.

Note 5. The image processing apparatus according to Note 1, where the seam line acquisitor includes:
an aligner configured to roughly align the first image with the second image, to obtain an overlapping region of the first image with the second image; and
an acquisitor configured to acquire the seam line in the overlapping region, where the seam line passes through a minimum number of foreground pixels.

Note 6. The image processing apparatus according to Note 5, where the aligner is configured to roughly align the first image with the second image with a template matching method or a keypoint matching method.

Note 7. The image processing apparatus according to Note 5, where the acquisitor is configured to acquire the seam line in the overlapping region with a dynamic path planning method.

Note 8. The image processing apparatus according to Note 1, where the fuser is configured to fuse the first image with the second image with an interpolation method.

Note 9. The image processing apparatus according to Note 1, further including: a processor configured to blur a fused image.

Note 10. An image processing method, including:
acquiring a seam line of a first image in images to be stitched;
segmenting, in an extension direction of the seam line of the first image, a center region including the seam line in the first image into blocks, where an intersection point of a block boundary with the seam line of the first image is located in a strong gradient region;
performing keypoint matching based on the intersection point to find a coordinate point corresponding to the intersection point in a position region corresponding to the seam line in a second image in the images to be stitched; and
fusing the first image with the second image based on the intersection point and the coordinate point.

Note 11. The image processing method according to Note 10, where the segmenting the center region including the seam line in the first image into blocks includes
scanning the seam line of the first image in the extension direction;
setting, in a case that a black pixel of the seam line of the first image is scanned and successive black pixels of which the number is greater than a preset threshold immediately after the black pixel are scanned, the black pixel as an intersection point of a block with the seam line of the first image; and
setting, in a case that a white pixel of the seam line of the first image immediately after a black pixel is scanned and successive black pixels of which the number is greater than a preset threshold immediately before the black pixel are scanned, the black pixel as an intersection point of a block with the seam line of the first image.

Note 12. The image processing method according to Note 10, further including:
acquiring a connected region having an area greater than a preset value in the center region, and
segmenting the center region into blocks, where the block boundary does not pass through the connected region.

Note 13. The image processing method according to Note 12, where the acquiring the connected region having an area greater than a preset value in the center region includes:
calculating a gradient image of the first image;
calculating a binary image of the first image based on the gradient image; and
calculating the connected region based on the binary image.

Note 14. The image processing method according to Note 10, where the acquiring the seam line of the first image in images to be stitched includes:

roughly aligning the first image with the second image, to obtain an overlapping region of the first image with the second image; and acquiring the seam line in the overlapping region, where the seam line passes through a minimum number of foreground pixels.

Note 15. The image processing method according to Note 14, where the first image is roughly aligned with the second image with a template matching method or a keypoint matching method.

Note 16. The image processing method according to Note 14, where the seam line in the overlapping region is acquired with a dynamic path planning method.

Note 17. The image processing method according to Note 10, where the first image is fused with the second image with an interpolation method.

Note 18. The image processing method according to Note 10, further including:
blurring a fused image.

Note 19. A machine-readable storage medium in which a program product including machine-readable instruction codes stored therein is carried, where when being read and executed by a computer, the instruction codes enable the computer to perform the method according to any one of Notes 10 to 18.

Although a few embodiments have been shown and described, it would be appreciated by those skilled in the art that changes may be made in these embodiments without departing from the principles and spirit thereof, the scope of which is defined in the claims and their equivalents.

What is claimed is:

1. An image processing apparatus, including: a seam line acquisitor configured to acquire a seam line of a first image in images to be stitched; a segmenter configured to segment, in an extension direction of the seam line of the first image, a center region including the seam line in the first image into blocks, wherein an intersection point of a block boundary with the seam line of the first image is located in a strong gradient region; a matcher configured to perform keypoint matching based on the intersection point to find a coordinate point corresponding to the intersection point in a position region corresponding to the seam line in a second image in the images to be stitched; and a fuser configured to fuse the first image with the second image based on the intersection point and the coordinate point, wherein the segmenter includes: a scanner configured to scan the seam line of the first image in the extension direction; a first setter configured to set, when a black pixel of the seam line of the first image is scanned and successive black pixels of which the number is greater than a preset threshold immediately after the black pixel are scanned, the black pixel as a first intersection point of a block with the seam line of the first image; and a second setter configured to set, when a white pixel of the seam line of the first image immediately after a black pixel is scanned and successive black pixels of which the number is greater than a preset threshold immediately before the black pixel are scanned, the black pixel as a second intersection point of the block with the seam line of the first image.

2. The image processing apparatus according to claim 1, further including:
a connected region acquisitor configured to acquire a connected region having an area greater than a preset value in the center region, wherein the segmenter is configured to segment the center region into blocks, wherein the block boundary does not pass through the connected region.

3. The image processing apparatus according to claim 2, wherein the connected region acquisitor includes:
a first calculator configured to calculate a gradient image of the first image;
a second calculator configured to calculate a binary image of the first image based on the gradient image; and
a third calculator configured to calculate the connected region based on the binary image.

4. The image processing apparatus according to claim 1, wherein the seam line acquisitor includes:
an aligner configured to roughly align the first image with the second image, to obtain an overlapping region of the first image with the second image; and
an acquisitor configured to acquire the seam line in the overlapping region, wherein the seam line passes through a minimum number of foreground pixels.

5. The image processing apparatus according to claim 4, wherein the aligner is configured to roughly align the first image with the second image with one of a template matching method and a keypoint matching method.

6. The image processing apparatus according to claim 4, wherein the acquisitor is configured to acquire the seam line in the overlapping region with a dynamic path planning method.

7. The image processing apparatus according to claim 1, wherein the fuser is configured to fuse the first image with the second image with an interpolation method.

8. The image processing apparatus according to claim 1, further including:
a processor configured to blur a fused image.

9. An image processing method, including:
acquiring a seam line of a first image in images to be stitched;
segmenting, in an extension direction of the seam line of the first image, a center region including the seam line in the first image into blocks, wherein an intersection point of a block boundary with the seam line of the first image is located in a strong gradient region;
performing keypoint matching based on the intersection point to find a coordinate point corresponding to the intersection point in a position region corresponding to the seam line in a second image in the images to be stitched; and
fusing the first image with the second image based on the intersection point and the coordinate point,
wherein the segmenting the center region including the seam line in the first image into blocks includes
scanning the seam line of the first image in the extension direction;
setting, when a black pixel of the seam line of the first image is scanned and successive black pixels of which the number is greater than a preset threshold immediately after the black pixel are scanned, the black pixel as a first intersection point of a block with the seam line of the first image; and
setting, in a case that a white pixel of the seam line of the first image immediately after a black pixel is scanned and successive black pixels of which the number is greater than a preset threshold immediately before the black pixel are scanned, the black pixel as a second intersection point of the block with the seam line of the first image.

10. The image processing method according to claim 9, further including:
acquiring a connected region having an area greater than a preset value in the center region, and segmenting the center region into blocks, wherein the block boundary does not pass through the connected region.

11. The image processing method according to claim 10, wherein the acquiring the connected region having an area greater than a preset value in the center region includes:
   calculating a gradient image of the first image;
   calculating a binary image of the first image based on the gradient image; and
   calculating the connected region based on the binary image.

12. The image processing method according to claim 9, wherein the acquiring the seam line of the first image in images to be stitched includes:
   roughly aligning the first image with the second image, to obtain an overlapping region of the first image with the second image; and
   acquiring the seam line in the overlapping region, wherein the seam line passes through a minimum number of foreground pixels.

13. The image processing method according to claim 12, wherein the first image is roughly aligned with the second image with one of a template matching method and a keypoint matching method.

14. The image processing method according to claim 12, wherein the seam line in the overlapping region is acquired with a dynamic path planning method.

15. The image processing method according to claim 9, wherein the first image is fused with the second image with an interpolation method.

16. The image processing method according to claim 9, further including:
   blurring a fused image.

17. A non-transitory machine-readable storage medium in which a program product including machine-readable instruction codes stored therein is carried, where when being read and executed by a computer, the instruction codes enable the computer to perform the method according to claim 9.

* * * * *